US006314803B1

(12) United States Patent
Pennese et al.

(10) Patent No.: US 6,314,803 B1
(45) Date of Patent: Nov. 13, 2001

(54) METHOD FOR SURVEYING THE OPERATING CONDITIONS OF AN INTERNAL COMBUSTION ENGINE WITH SPARK IGNITION

(75) Inventors: Michele Pennese; Daniele Rossi, both of Milan (IT)

(73) Assignees: Magneti Marelli SpA; Federal-Mogul Ignition SpA, both of Milan (IT)

(*) Notice: Subject to any disclaimer, the term of this patent is extended or adjusted under 35 U.S.C. 154(b) by 0 days.

(21) Appl. No.: 09/372,199

(22) Filed: Aug. 11, 1999

(30) Foreign Application Priority Data

Aug. 12, 1998 (EP) ............................................ 98830503

(51) Int. Cl.[7] ............................................ G01M 15/00
(52) U.S. Cl. ............................ 73/117.3; 73/115; 73/116; 324/402
(58) Field of Search ......................... 73/115, 116, 117.2, 73/117.3; 324/378–402

(56) References Cited

U.S. PATENT DOCUMENTS

| | | | | |
|---|---|---|---|---|
| 4,135,154 | | 1/1979 | Ogura et al. . | |
| 4,417,556 | | 11/1983 | Latsch . | |
| 4,491,110 | * | 1/1985 | Bone et al. | 73/115 |
| 5,215,067 | * | 6/1993 | Shimasaki et al. | 324/399 |
| 5,226,394 | * | 7/1993 | Shimasaki et al. | 324/399 |
| 5,349,299 | * | 9/1994 | Kanehiro et al. | 324/399 |
| 5,492,007 | * | 2/1996 | Noble et al. | 73/117.3 |

FOREIGN PATENT DOCUMENTS

| | | |
|---|---|---|
| PCT/SE95/00912 | 2/1996 | (WO) . |
| PCT/RU97/00164 | 4/1997 | (WO) . |

* cited by examiner

*Primary Examiner*—George Dombroske
(74) *Attorney, Agent, or Firm*—Reising, Ethington, Barnes, Kisselle, Learman & McCulloch, P.C.

(57) ABSTRACT

A method for surveying the operating conditions of an internal combustion engine with spark ignition, wherein in one and the same engine cycle a plurality of primary charging cycle are generated which produce corresponding secondary discharge cycles. The pressure pattern in the combustion chamber is determined, in each period of time, as the product of the maximum intensity of the induced primary voltage ($V1_i$) by the respective duration ($t_i$).

8 Claims, 2 Drawing Sheets

METHOD FOR SURVEYING THE OPERATING CONDITIONS OF AN INTERNAL COMBUSTION ENGINE WITH SPARK IGNITION

The present invention relates to a method for surveying the operating conditions of an internal combustion engine with spark ignition.

More precisely, the invention is directed to a method for monitoring the compression and ignition thermodynamic cycle in the combustion chamber of an internal combustion engine having an ignition system including an ignition coil whose secondary winding is connected to an electric actuator, typically constituted by a spark plug, adapted to transform an impulse of electric energy into a spark which produces the ignition of the combustion mixture.

Modern electronic control units of internal combustion engines can influence a great number of engine operating parameters for optimising the global behaviour of the engine in terms of power output, reduction of fuel consumption, reduction of pollution, etc. For a correct operation, an electronic control unit must receive precise and reliable information on the engine operating conditions. The pressure in combustion chamber is one of the parameter whose monitoring is most difficult. By monitoring the pressure into the combustion chamber it is possible to obtain important information which permit for instance to determine the presence of anomalous combustion conditions (misfire, knocking, etc.). It is known that internal combustion engines have an optimum efficiency in conditions of incipient knocking. An accurate control of the pressure cycle would permit to get progressively closer to operating condition of incipient knocking without ever reaching conditions of actual knocking.

Known systems for surveying the pressure cycle in the combustion chamber are generally based on the use of one or more pressure sensors. A system based on the direct measure of the pressure in the combustion chamber can be used in a laboratory during experimental tests for calibration of engines but, for reasons of costs, can not be used on engines for series produced motor-vehicles.

The present invention has the object to provide a method for carrying out an accurate diagnosis of the engine operating conditions, with particular respect to the variation of the pressure during the compression and ignition cycle, without using sensors specifically intended for this use.

According to the present invention this object is achieved by a method having the features forming the subject of the main claim.

Characteristics and advantages of the method according to the invention will become evident in the course of the detailed description which follows, given purely by way of non-limiting example, with reference to the appended drawings, in which.

Figure 1:
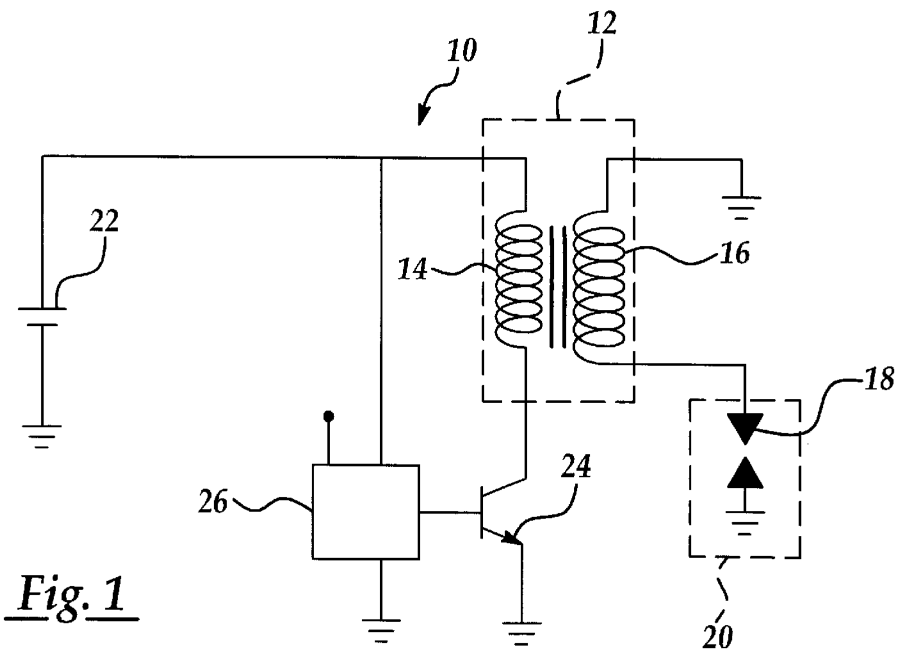
FIG. 1 is a scheme of an electronically controlled ignition system.

In FIG. 1 an ignition system for an internal combustion engine for vehicles is indicated 10. The ignition system 10 comprises an ignition coil 12 having a primary winding 14 and a secondary winding 16. The secondary winding 16 is connected to a spark plug 18 whose electrodes extend in the combustion chamber of the engine, schematically indicated 20. The primary winding 14 of the coil 12 is supplied, in a way per se known, by a battery 22. A transistor 24 driven by an electronic control unit 26 cyclically opens and closes the primary circuit for producing a series of charging cycles during each of which the primary current progressively grows from zero to a maximum value and then returns bruscally to zero in the moment in which it is necessary to produce a spark between the electrodes of the spark plug 18.

Figure 3:
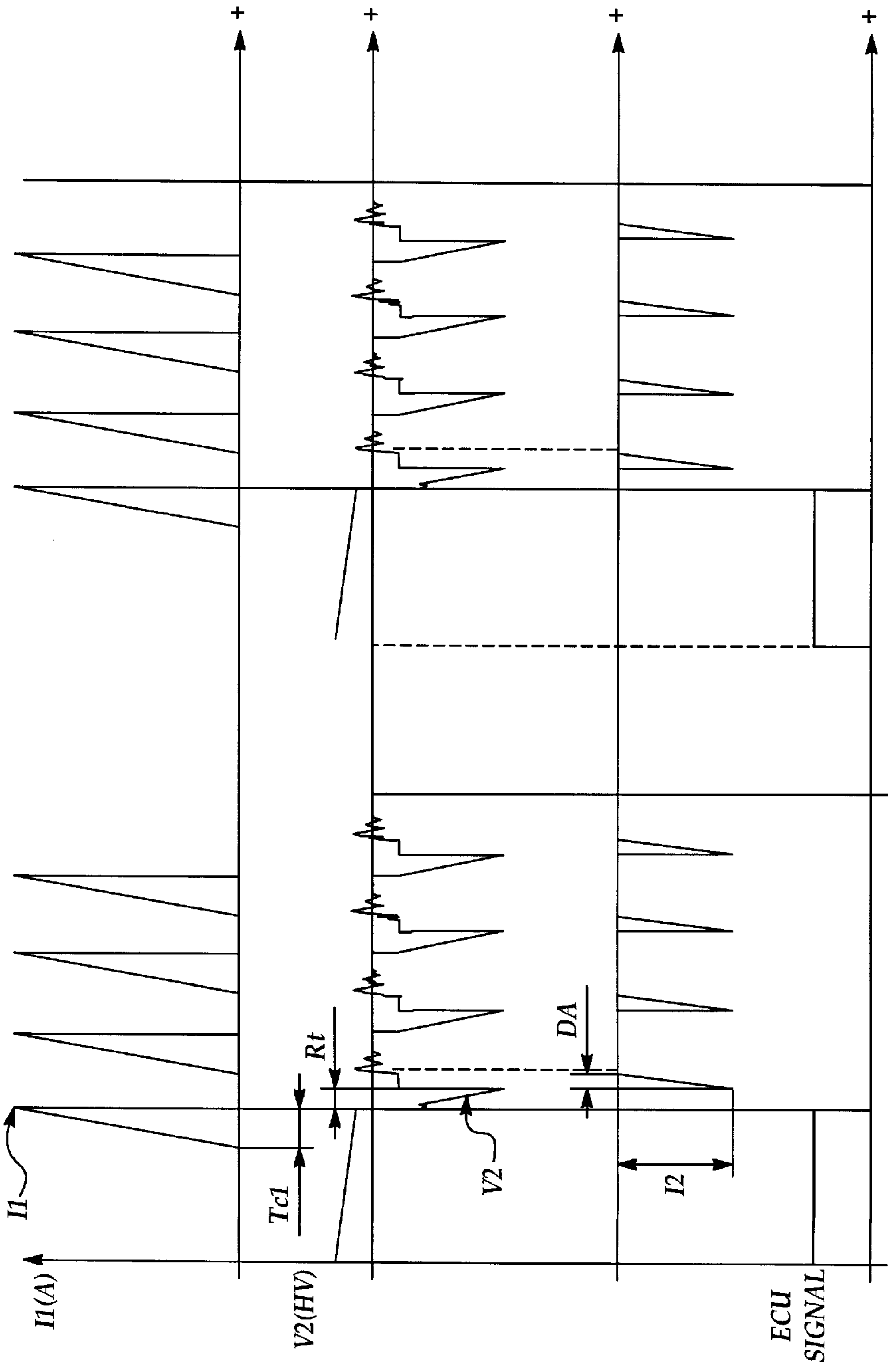
FIG. 3 shows schematically the variation of primary current and secondary current and voltage in a method according to the present invention.

The electronic control unit 26 is programmed for operating according to the “multi-spark” principle disclosed in detail in European patent application No. 97 830 265.1. More precisely, the control unit 26 produces a plurality of charging cycles on the primary winding 14 during one and the same engine cycle. The operating principle of the multi-spark system is schematically shown in FIG. 3 which shows the time patterns of the primary current I1, the secondary voltage V2 and the secondary current I2.

According to the present invention, the multi-spark ignition system is used for carrying out a diagnosis of the engine operating conditions and more precisely for obtaining information relating to the compression and ignition thermodynamic cycle in the combustion chamber.

The present invention is based on the coupling phenomenon between the primary and secondary circuits of the ignition coil 12. It is known that a voltage variation on one of the two windings produces a corresponding voltage variation on the other winding and that the amplitudes of the primary and secondary voltages are related by a constant rate equal to the inverse rate between the number of coils of the two windings. Consequently, the secondary voltage V2 produced by each primary charging cycle produces on the primary winding a corresponding voltage variation whose maximum intensity is proportional to the maximum intensity of the peak of the secondary voltage V2. The duration of the voltage induced on the primary winding is also directly connected to the duration of each cycle of secondary voltage V2. In practice, the primary circuit of the ignition coil 12 is a mirror image of the physical phenomenons which intervene on the secondary circuit and permits to observe the variations of the electrical parameters relating to the operation of the spark plug 18.

On the basis of this physical principle, according to the present invention it is possible to survey the pressure variation in the combustion chamber by detecting electrical parameters on the primary circuit of the ignition coil 12. It has been observed experimentally that the product of the induced primary voltage by the respective duration has a time pattern which reproduces the time pattern of the pressure in the combustion chamber.

Figure 2:
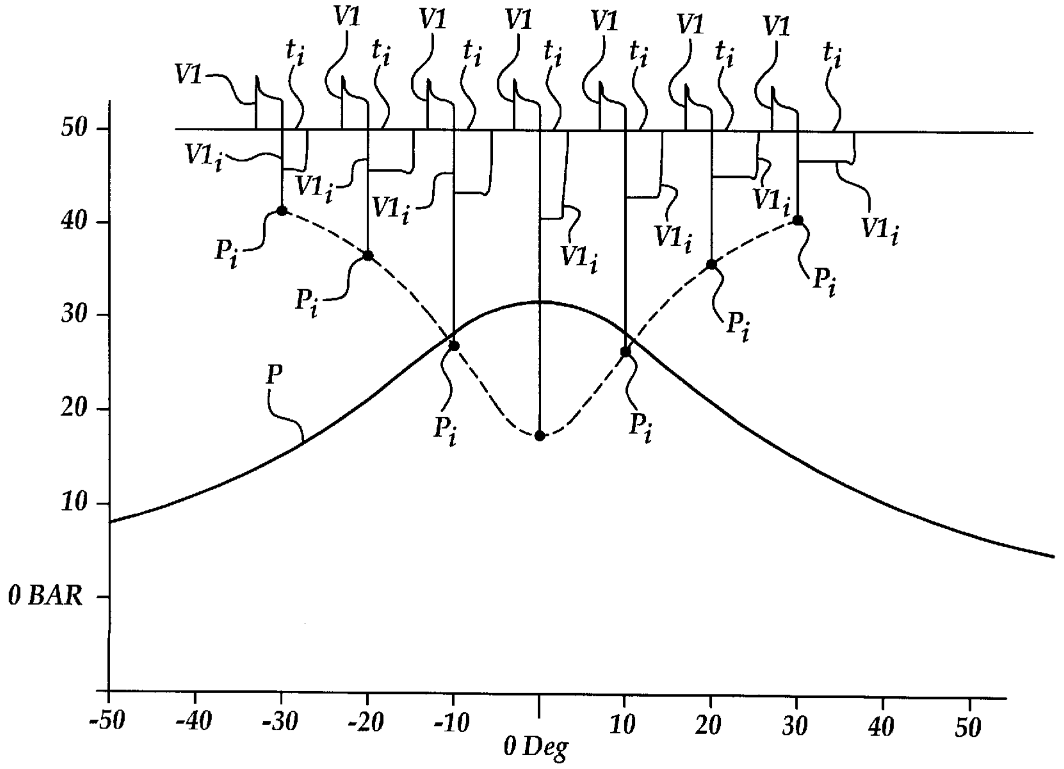
FIG. 2 shows schematically a compression cycle in the combustion chamber and the cycle as detected on the primary circuit of the ignition coil.

FIG. 2 schematically shows the pressure variation in the combustion chamber as a function of the engine crank angle, during a cycle of compression and expansion of the gas. The continues line P indicates the pressure variation in the combustion chamber. In the same figure are shown the time patterns of the primary voltage V1 in correspondence with each primary charging cycle. In the graph of FIG. 2 is indicated $\mathbf{V1}_i$ the primary voltage induced by the peaks of secondary voltage V2. Experimental tests have shown that the intensity of the induced primary voltage $\mathbf{V1}_i$ grows with the pressure P in the combustion chamber. The duration $t_i$ of each cycle of induced primary voltage $\mathbf{P1}_i$ decreases with an increase of pressure P. Tests carried out by the applicants have shown that the product of the maximum intensity of the induced primary voltage $\mathbf{V1}_i$ by the respective duration $t_i$ is an estimate of the pressure P in the combustion chamber in the corresponding period of time. The points $P_i$ in the scheme of FIG. 2 are the indicative values of the individual products $P_i$ by the respective times $t_i$. The broken line passing for the individual points $P_i$ has a pattern substantially corresponding to the one of the pressure P.

The electronic control unit 26 is programmed for detecting the maximum intensity and the duration of each cycle of induced primary voltage $V1_i$. These values are stored and processed for obtaining information relating to the pressure cycle in the combustion chamber. The knowledge of pattern of the pressure cycle is an important diagnosis instrument which can be used in different ways depending on the needs. For instance, the knowledge of the time pattern of pressure P can be used in the starting phase for determining which one is the cylinder in phase. In driving condition, it serves for detecting anomalous combustion conditions as well as for detecting the position of the peak of maximum pressure. By calculating the derivative of the pressure cycle it is possible to de-ermine the point in which begins the combustion of the air-gasoline mixture. Or, by calculating the integral of the pressure cycle an indicative value of the mean effective pressure can be obtained which is proportional to the energy produced during the cycle.

What is claimed is:

1. A method for surveying the operating conditions of an internal combustion engine with spark ignition, including at least one actuator placed in a combustion chamber and an ignition coil having a secondary winding connected to the actuator and a primary winding connected to an ignition system programmed for producing a series of charging cycles which generate corresponding spark cycles on the actuator, the method comprising the steps of:

detecting the intensity and the duration of an electrical quantity induced on the primary winding by each secondary spark, and determining an estimated value of the pressure in the combustion chamber as the product of the intensity and duration of the induced electrical quantity.

2. A method according to claim 1, wherein during a single engine cycle a plurality of secondary discharge cycles are produced, in correspondence with each of which the intensity of the induced primary voltage and the respective duration are detected.

3. A method according to claim 2, wherein a plurality of values are stored, indicative of the pressure in the combustion chamber in corresponding period of time, each value indicative of the pressure being obtained as the product of the maximum intensity of the induced primary voltage and its duration.

4. A method according to claim 1, wherein the actuator comprises a spark plug and the induced electrical quantity comprises voltage.

5. A method for monitoring pressure within a combustion chamber of an internal combustion engine that includes an ignition system which utilizes an ignition coil having a primary winding and secondary winding to produce a spark discharge within the combustion chamber, the method comprising the steps of:

measuring the amplitude and duration of a voltage induced on the primary winding during the spark discharge; and calculating a value indicative of combustion chamber pressure using the measured amplitude and duration of that measured voltage.

6. A method according to claim 5, further comprising the steps of producing a plurality of spark discharges during each combustion cycle and carrying out said measuring and calculating steps for each of the voltages induced on the primary winding as a result of the spark discharges.

7. A method according to claim 6, further comprising the step of using the calculated values to determine an operating condition of the engine.

8. A method according to claim 5, wherein said calculating step further comprises multiplying the measured amplitude with the measured duration.

* * * * *

UNITED STATES PATENT AND TRADEMARK OFFICE

CERTIFICATE OF CORRECTION

PATENT NO. : 6,314,803 B1 Page 1 of 1
DATED : November 13, 2001
INVENTOR(S) : Michele Pennese and Daniele Rossi It is certified that error appears in the above-identified patent and that said Letters Patent is hereby corrected as shown below:

Column 1,
Line 24, after "in" insert therein -- a --.
Line 24, delete "parameter" and insert therefor -- parameters --.

Column 2,
Line 8, delete "bruscally" and insert therefor -- basically --.
Line 54, delete "continues" and insert therefor -- continuous --.

Column 3,
Line 18, delete "de-ermine" and insert therefor -- determine --.

Signed and Sealed this

Tenth Day of June, 2003

JAMES E. ROGAN
*Director of the United States Patent and Trademark Office*